ns Patent [19]

United States Patent [19]

Baumann et al.

[11] 4,424,153
[45] Jan. 3, 1984

[54] 1:2 CHROMIUM COMPLEX DYES CONTAINING SULFONIC ACID GROUPS

[75] Inventors: Hans Baumann, Wachenheim; Klaus Grychtol, Bad Durkheim, both of Fed. Rep. of Germany

[73] Assignee: BASF Aktiengesellschaft, Ludwigshafen, Fed. Rep. of Germany

[21] Appl. No.: 295,373

[22] Filed: Aug. 24, 1981

[30] Foreign Application Priority Data

Sep. 10, 1980 [DE] Fed. Rep. of Germany ....... 3034002

[51] Int. Cl.$^3$ .............................................. C09B 45/14
[52] U.S. Cl. ................ 260/149; 260/145 A; 260/145 B
[58] Field of Search ................ 260/149, 145 A, 145 B

[56] References Cited

U.S. PATENT DOCUMENTS

| | | | |
|---|---|---|---|
| 2,985,646 | 5/1961 | Schetty et al. | 260/149 X |
| 3,978,037 | 8/1976 | Beffa et al. | 260/149 X |
| 4,033,942 | 7/1977 | Beffa et al. | 260/145 B X |
| 4,052,374 | 10/1977 | Baumann | 260/149 X |
| 4,102,879 | 7/1978 | Baumann | 260/149 |
| 4,116,952 | 9/1978 | Beffa et al. | 260/145 B |

FOREIGN PATENT DOCUMENTS

| | | |
|---|---|---|
| 2123453 | 11/1972 | Fed. Rep. of Germany . |
| 2501469 | 7/1976 | Fed. Rep. of Germany ...... 260/149 |
| 1387976 | 3/1975 | United Kingdom . |
| 1503000 | 3/1978 | United Kingdom . |

*Primary Examiner*—Helen M. S. Sneed
*Attorney, Agent, or Firm*—Oblon, Fisher, Spivak, McClelland & Maier

[57] ABSTRACT

1:2 Chromium complexes of arylazo-azamethines of the general formula where A is a naphthalene or benzene radical which may be monosubstituted or polysubstituted by alkyl, alkoxy or halogen.

3 Claims, No Drawings

1:2 CHROMIUM COMPLEX DYES CONTAINING SULFONIC ACID GROUPS

BACKGROUND OF THE INVENTION

Field of the Invention

The present invention relates to 1:2 chromium complexes of arylazo-azamethines of the general formula

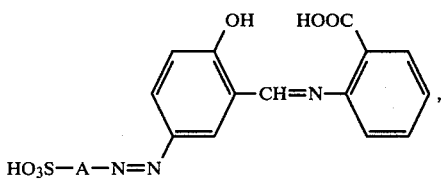

where A is a naphthalene or benzene radical which may be monosubstituted or polysubstituted by alkyl, alkoxy or halogen.

DETAILED DESCRIPTION OF THE INVENTION

Examples of $HO_3S-A-NH_2$ are 1-aminonaphthalene-4-, -5-, -6- or -7-sulfonic acid, 2-aminonaphthalene-5-, -7- or -8-sulfonic acid, 1-aminobenzene-3- or -4-sulfonic acid, 1-methyl-2-aminobenzene-4- or -5-sulfonic acid, 1-methyl-4-aminobenzene-2- or -3-sulfonic acid, 1,4-dimethyl-2-aminobenzene-5-sulfonic acid, 1-chloro-2-aminobenzene-4- or -5-sulfonic acid, 1-chloro-2-methyl-5-aminobenzene-4-sulfonic acid, 1-chloro-4-aminobenzene-2-sulfonic acid, 1,4-dichloro-2-aminobenzene-5-sulfonic acid, 1-methoxy-2-aminobenzene-4-sulfonic acid, 1-ethoxy-4-aminobenzene-2-sulfonic acid, 1,4-dimethoxy-2-aminobenzene-5-sulfonic acid and 1-chloro-4-methoxy-5-aminobenzene-2-sulfonic acid.

Salicylaldehyde is used as the coupling component and anthranilic acid as the azamethine component.

The chromium complexes are prepared by conventional methods in aqueous solution at an elevated temperature, preferably at the boil. The chromium donors used are trivalent chromium salts, for example the chloride, sulfate, formate, acetate or tartrate, or chromates in the presence of reducing agents.

The acid liberated on complexing is neutralized by bases such as alkali metal hydroxides or carbonates, or aliphatic amines or aminoalcohols, or is buffered by alkali metal salts of carboxylic acids, such as salts of formic acid, acetic acid, iminotriacetic acid, tartaric acid or adipic acid.

Advantageously, the individual components, ie. the arylazosalicylaldehyde and anthranilic acid, are employed in place of the arylazo-azamethine.

The 1:2 chromium complexes formed are isolated by filtration, either direct or after salting out or acidifying, depending on their solubility. If suitable N-bases, such as relatively long-chain alkylamines or alkoxyalkylamines, diarylguanidines or arylbiguanidines, are used, the complexes are precipitated as water-in-soluble, organophilic ammonium salts of the dye complex acids, and can in this way be isolated free from mineral salts. The complexes can also be isolated as water-soluble powders by evaporating or spray-drying the reaction solutions.

The complex dyes can also be obtained as storage-stable solutions, free from mineral salts, if the complexing is carried out with an alkanolamine as the neutralizing agent, in the presence or absence of an organic solvent, such as an alkoxyalkanol or acid amide.

The dyes may be used for dyeing and printing natural or synthetic nitrogen-containing materials, such as wool, leather, nylons or polyurethanes. When free from mineral salts, the dyes can also be used for coloring organic liquids or compositions, such as surface coatings, inks or wood stains, as well as for spin-dyeing synthetic fibers.

Intense yellow to yellowish orange colorations having good fastness characteristics, in particular good lightfastness, are obtained.

Surprisingly, the novel compounds are superior in lightfastness to the complex dye disclosed in German Laid-Open Application DOS 2,123,453, which contains a nitro group in the arylazo radical, and a hydroxysulfonylanthranilic acid as the azamethine component. Compared to the unsymmetrical chromium complexes which are disclosed in German Patent 2,501,469, which are each obtained from one arylazo-azamethine and one azamethine, the novel compounds have greater color strength, are simpler to prepare, and frequently have improved wetfastness on wool.

Having generally described the invention, a more complete understanding can be obtained by reference to certain specific examples, which are provided herein for purposes of illustration only and are not intended to be limiting unless otherwise specified.

EXAMPLES

EXAMPLE 1

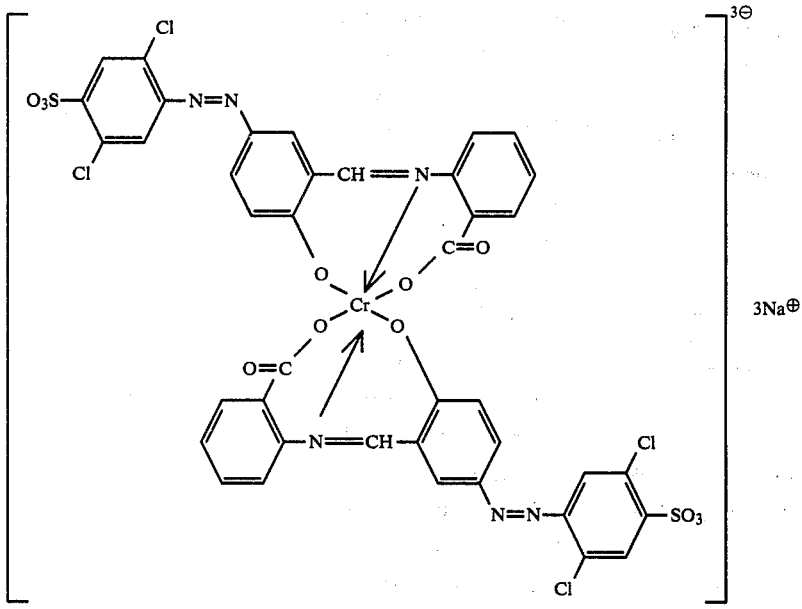

112.5 parts of the azo compound obtained from diazotized 1,4-dichloro-2-aminobenzene-5-sulfonic acid and salicylaldehyde are stirred with 42 parts of anthranilic acid in 1,200 parts of water and then heated with 12 parts of sodium hydroxide and 50 parts of sodium acetate for one hour at 50° C. After addition of a chromium-III formate solution prepared from an amount of hydrated chromium-III oxide corresponding to 12 parts of $Cr_2O_3$, 14 parts of formic acid and 250 parts of water, the mixture is refluxed until a thin layer chromatogram indicates complete conversion to the 1:2 chromium complex. The mixture is brought to pH 7.8 with sodium carbonate solution and is filtered, and the complex dye is isolated by evaporation or spray-drying. The brown dye powder, obtained in an amount of 246 parts and containing 33% of sodium acetate and sodium formate, gives reddish yellow dyeings, having good lightfastness and wetfastness, on wool and nylon fibers. On chrome-tanned leather, a deep yellowish orange coloration is obtained.

EXAMPLE 2

33 parts of the sodium salt of the azo compound aniline-4-sulfonic acid→salicylaldehyde are dissolved in 400 parts of water at 70° C. and 14 parts of anthranilic acid and 27 parts of sodium formate are added. A solution of 14 parts of chromium-III chloride ($CrCl_3.6H_2O$) in 50 parts of water is added and the mixture is boiled, the pH being kept at 6.5 by gradual addition of dilute sodium hydroxide solution. After completion of complexing, the mixture is filtered and the product is precipitated with 120 parts of sodium chloride and filtered off when cold. On drying the product, 63 parts of a dye powder containing sodium chloride are obtained; this dyes wool in very lightfast neutral yellow hues.

The Table which follows shows the diazo components of other arylazo-azamethine complexes conforming to the general formula, and the hues of the dyeings these complexes give on wool and nylon.

| Example | $HO_3S-A-NH_2$ | Hue |
|---|---|---|
| 3 | 2-Aminonaphthalene-5-sulfonic acid | yellowish orange |
| 4 | 1-Aminobenzene-3-sulfonic acid | yellow |
| 5 | 1-Chloro-2-aminobenzene-4-sulfonic acid | greenish yellow |
| 6 | 1-Methyl-2-aminobenzene-5-sulfonic acid | reddish yellow |
| 7 | 1-Methoxy-2-aminobenzene-5-sulfonic acid | yellowish orange |
| 8 | 1-Ethoxy-4-aminobenzene-3-sulfonic acid | yellowish orange |
| 9 | 1,4-Dimethoxy-2-aminobenzene-5-sulfonic acid | orange |
| 10 | 1-Chloro-4-methoxy-5-aminobenzene-2-sulfonic acid | yellowish orange |
| 11 | 4-Chloro-1-aminobenzene-3-sulfonic acid | yellow |

EXAMPLE 12

An aqueous chromium-III formate solution (the amount of formate corresponding to 3.8 parts of $Cr_2O_3$), prepared as in Example 1, is added to a suspension of 31 parts of the azo compound aniline-4-sulfonic acid→salicylaldehyde and 14 parts of anthranilic acid in 150 parts of dipropylene glycol, and the mixture is heated at 90° C. A neutral pH is maintained by gradually adding a total of 21 parts of diethanolamine. After completion of the reaction, the mixture is diluted with 110 parts of water, brought to pH 8.0 with about 6 parts of diethanolamine and filtered at 60° C. Dilution to 360 parts with dipropylene glycol gives a dye solution which is storage-stable and contains about 60 parts of the diethanolamine salt of the complex of Example 2.

The tinctorial properties and fastness characteristics of the product are similar to those of the dye of Example 2; being a liquid formulation, the product is particularly suitable for use in continuous dyeing and printing processes carried out on textile floor coverings consisting of nylons or wool.

Having now fully described the invention, it will be apparent to one of ordinary skill in the art that many changes and modifications can be made thereto without departing from the spirit or scope of the invention as set forth therein.

What is claimed as new and desired to be secured by Letters Patent of the United States is:

1. A 1:2 chromium complex dye of an arylazo-azamethine of the general formula:

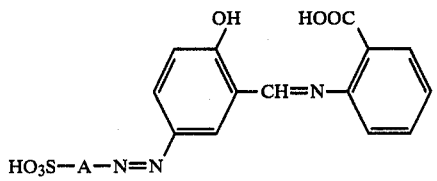

as a salt;

where A is naphthalene or benzene radical which may be monosubstituted or polysubstituted by alkyl, alkoxy or halogen.

2. The chromium complex dye of claim 1 wherein A is phenylene optionally substituted by chlorine, methyl or methoxy.

3. A 1:2 chromium complex dye of an arylazoazamethine of the formula:

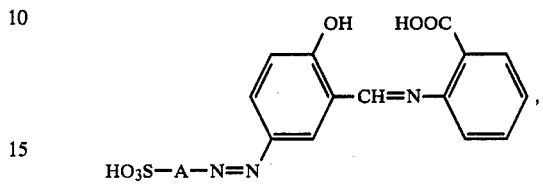

as the sodium salt.

* * * * *